(12) United States Patent
Han et al.

(10) Patent No.: US 10,808,837 B2
(45) Date of Patent: Oct. 20, 2020

(54) VEHICLE AND METHOD OF CONTROLLING THE SAME

(71) Applicants: Hyundai Motor Company, Seoul (KR); Kia Motors Corporation, Seoul (KR)

(72) Inventors: Soolim Han, Hwaseong-Si (KR); Ja-chun Han, Hwaseong-si (KR); Jea Myoung Youn, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 16 days.

(21) Appl. No.: 16/437,400

(22) Filed: Jun. 11, 2019

(65) Prior Publication Data

US 2020/0173548 A1    Jun. 4, 2020

(30) Foreign Application Priority Data

Nov. 29, 2018  (KR) .................. 10-2018-0150272

(51) Int. Cl.
| | |
|---|---|
| *F16H 61/16* | (2006.01) |
| *F16H 61/02* | (2006.01) |
| *F16H 61/468* | (2010.01) |
| *F16H 63/50* | (2006.01) |
| *F16H 59/66* | (2006.01) |
| *F16H 61/66* | (2006.01) |

(52) U.S. Cl.
CPC ......... *F16H 61/16* (2013.01); *F16H 61/0204* (2013.01); *F16H 61/468* (2013.01); *F16H 2059/663* (2013.01); *F16H 2061/6611* (2013.01); *F16H 2063/508* (2013.01)

(58) Field of Classification Search
None
See application file for complete search history.

(56) References Cited

U.S. PATENT DOCUMENTS

| | | | |
|---|---|---|---|
| 9,610,859 B1 * | 4/2017 | Cho | B60L 15/20 |
| 10,066,749 B2 * | 9/2018 | Kinoshita | F16H 63/483 |
| 2019/0193736 A1 * | 6/2019 | Yamada | B60W 10/18 |
| 2019/0242478 A1 * | 8/2019 | Kawaguchi | B60W 30/18027 |
| 2019/0257423 A1 * | 8/2019 | Fedullo | F16H 63/48 |
| 2020/0096101 A1 * | 3/2020 | Kasami | B60W 10/182 |

* cited by examiner

*Primary Examiner* — Dirk Wright
(74) *Attorney, Agent, or Firm* — Morgan, Lewis & Bockius LLP

(57) ABSTRACT

A vehicle in which a shift lever of a Shift-by-Wire (SBW) type is used, the vehicle may include an inputter configured to receive pressing force of an acceleration pedal of the vehicle, a shift command to a P-stage of the shift lever, and gradient information related to a road on which the vehicle drives; a controller configured to: when the pressing force of the acceleration pedal of the vehicle is generated and the shift command to the P-stage is input to the controller, determine a gradient load torque and an acceleration torque of the vehicle, and limit a driver's requested torque based on the determined gradient load torque and the determined acceleration torque; and a driving device connected to the controller and configured to shift the shift lever to the P-stage when the driver's requested torque is limited.

20 Claims, 10 Drawing Sheets

VEHICLE AND METHOD OF CONTROLLING THE SAME

CROSS-REFERENCE TO RELATED APPLICATION(S)

The present application claims priority to Korean Patent Application No. 10-2018-0150272, filed on Nov. 29, 2018 in the Korean Intellectual Property Office, the entire contents of which is incorporated herein for all purposes by this reference.

BACKGROUND OF THE PRESENT INVENTION

Field of the Invention

The present invention relates to a vehicle and a method of controlling the vehicle, and more particularly, to a vehicle capable of protecting a parking sprag of a vehicle transmission, and a method of controlling the vehicle.

Description of Related Art

Vehicles are machines that drive on roads by driving their wheels.

The vehicles include motor vehicles (conventional engine-driven cars) driven with mechanical power produced by combusting fuel oil, such as gasoline and diesel, and eco-friendly vehicles driven by electric power to reduce the amount of harmful fuel emissions and increase fuel efficiency.

The eco-friendly vehicles include electric vehicles having a rechargeable power supply comprised of a battery and a motor, rotating the motor with electricity charged in the battery, and driving the wheels using the rotation of the motor; hybrid vehicles having an engine, a battery, and a motor and driven by controlling the mechanical power of the engine and the electric power of the motor; and hydrogen fuel cell vehicles.

The hybrid vehicles are driven in an Electric Vehicle (EV) mode using only the motor power, in a Hybrid Electric Vehicle (HEV) mode using both the engine power and the motor power, or in a regenerative braking mode charging the battery by recovering the braking energy from braking or inertial energy from coasting by inertia through a generating operation of the motor.

Furthermore, improved plug-in hybrid vehicles are being developed. The plug-in hybrid electric vehicles (PHEV) are vehicles that drive by the electric power of an externally charged battery and operate using an internal combustion engine and the electric power of the battery at the same time like conventional hybrid electric vehicles when the battery is discharged.

Apart from the eco-friendly vehicles, the vehicles may include a transmission. The transmission is a device that transmits the power generated by the engine to driving wheels by changing a rotational force and a speed to match a driving state of the vehicle, and is classified into a manual transmission and an automatic transmission.

A driver who drives the vehicle may change a speed change stage of the manual transmission or the automatic transmission to the desired speed change stage by operating a shift lever mounted on the surface of a console or a handle around a driver's seat.

The manual transmission may be operated by transmitting the driver's desired movement to the transmission through a cable or a rod when the driver selects a gear corresponding to a driving condition of the vehicle using the shift lever. The automatic transmission may be operated by driving an inhibitor switch through the cable to transmit the driver's desired movement to the transmission when the driver moves the shift lever.

In recent years, the shift lever of a Shift-by-Wire (SBW) type has been used. Unlike conventional mechanical type shift levers, the shift lever of the SBW type may receive a shift command through various operating methods.

In the case of the vehicle provided with the shift lever of the SBW type, it is typical to fix the vehicle with a parking sprag engaged in a reduction gear when a P-stage is input.

However, when the driver operates an accelerator pedal in a state where the vehicle is not stopped, an impact is applied to the parking sprag, which may cause a problem that a mechanism is damaged.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle for preventing damage of a parking sprag of the vehicle using a SBW type shift lever in advance, and a method of controlling the vehicle.

Additional aspects of the disclosure will be set forth in part in the description which follows and, in part, will be obvious from the description, or may be learned by practice of the disclosure.

In accordance with an aspect of the present invention, a vehicle in which a shift lever of a Shift-by-Wire (SBW) type is used, the vehicle may include: an inputter configured to receive a signal of a pressing force of an acceleration pedal of the vehicle, a shift command to a P-stage of the shift lever, and gradient information related to a road on which the vehicle drives; a controller configured to: when the pressing force of the acceleration pedal of the vehicle is applied by the driver and the shift command to the P-stage is input to the controller, determine a gradient load torque and an acceleration torque of the vehicle, and limit a driver's requested torque based on the determined gradient load torque and the determined acceleration torque; and a driving device connected to the controller and configured to shift the shift lever to the P-stage when the driver's requested torque is limited.

The controller may limit the driver's requested torque to a minimum value of the determined acceleration torque and the determined gradient load torque and a maximum value of a predetermined specific torque when an input shift command of the vehicle is changed form a D-stage to the P-stage.

The controller may limit the driver's requested torque to a minimum value of the determined gradient load torque and a predetermined torque and a maximum value of the determined acceleration torque when the vehicle receives the shift command of shifting an R-stage to the P-stage.

The controller may limit the driver's requested torque with the gradient load torque when the vehicle receives the shift command of shifting the D-stage to the P-stage and the vehicle ascends on the road.

When the vehicle receives the shift command of shifting the D-stage to the P-stage and the vehicle is driving on the road which is flat, the controller may be configured to determine a final motor torque with a maximum value of the determined gradient load torque and the predetermined specific torque; and limit the driver's requested torque with the final motor torque.

The controller may limit the driver's requested torque with the determined gradient load torque when the vehicle receives the shift command of shifting the R-stage to the P-stage and the vehicle descends on the road.

When the vehicle receives the shift command of shifting the R-stage to the P-stage and the vehicle is driving on the road which is flat, the controller may be configured to determine a final motor torque with a minimum value of the gradient load torque and the predetermined specific torque and a maximum value of the determined acceleration torque; and limit the driver's requested torque with the final motor torque.

The inputter may receive a speed of the vehicle. The controller may be configured to determine the acceleration torque based on a predetermined map based on the speed of the vehicle and the applied pressing force of the acceleration pedal.

The controller may be configured to determine the gradient load torque based on a load of the vehicle, a gravitational acceleration, and the gradient information.

The driving device may shift the shift lever to the P-stage and engage a parking sprag of a transmission.

In accordance with another aspect of the present invention, a method of controlling a vehicle, the vehicle in which a shift lever of a Shift-by-Wire (SBW) type is used, the method may include: receiving, by an inputter, a pressing force of an acceleration pedal of the vehicle, a shift command to a P-stage of the shift lever, and gradient information related to a road on which the vehicle drives; when the pressing force of the acceleration pedal of the vehicle is applied by the driver and the shift command to the P-stage is input to the controller, by a controller, determining a gradient load torque and an acceleration torque of the vehicle, limiting, by the controller, a driver's requested torque based on the determined gradient load torque and the determined acceleration torque; and shifting, by a driving device, the shift lever to the P-stage when the driver's requested torque is limited.

The limiting of the driver's requested torque based on the determined gradient load torque and the determined acceleration torque may include limiting the driver's requested torque to a minimum value of the determined acceleration torque and the determined gradient load torque and a maximum value of a predetermined specific torque when the vehicle receives the shift command of shifting a D-stage to the P-stage.

The limiting of the driver's requested torque based on the determined gradient load torque and the determined acceleration torque may include limiting the driver's requested torque to a minimum value of the determined gradient load torque and a predetermined torque and a maximum value of the determined acceleration torque when the vehicle receives the shift command of shifting an R-stage to the P-stage.

The limiting of the driver's requested torque based on the determined gradient load torque and the determined acceleration torque may include limiting the driver's requested torque with the determined gradient load torque when the vehicle receives the shift command of shifting the D-stage to the P-stage and the vehicle ascends on the road.

When the vehicle receives the shift command of shifting the D-stage to the P-stage and the vehicle is driving on the road which is flat, the limiting of the driver's requested torque based on the determined gradient load torque and the determined acceleration torque may include determining a final motor torque with a maximum value of the determined gradient load torque and the predetermined specific torque; and limiting the driver's requested torque with the final motor torque.

The limiting of the driver's requested torque based on the determined gradient load torque and the determined acceleration torque may include limiting the driver's requested torque with the determined gradient load torque when the vehicle receives the shift command of shifting the R-stage to the P-stage and the vehicle descends on the road.

When the vehicle receives the shift command of shifting the R-stage to the P-stage and the vehicle is driving on the road which is flat, the limiting of the driver's requested torque based on the determined gradient load torque and the determined acceleration torque may include determining a final motor torque with a minimum value of the gradient load torque and the predetermined specific torque and a maximum value of the determined acceleration torque; and limiting the driver's requested torque with the final motor torque.

The inputter may receive a speed of the vehicle. The determining of the acceleration torque may include determining the acceleration torque based on a predetermined map based on the speed of the vehicle and the applied pressing force of the acceleration pedal.

The determining of the gradient load torque may include determining the gradient load torque based on a load of the vehicle, a gravitational acceleration, and the gradient information.

The method may further include: shifting the shift lever to the P-stage and engaging a parking sprag of a transmission.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
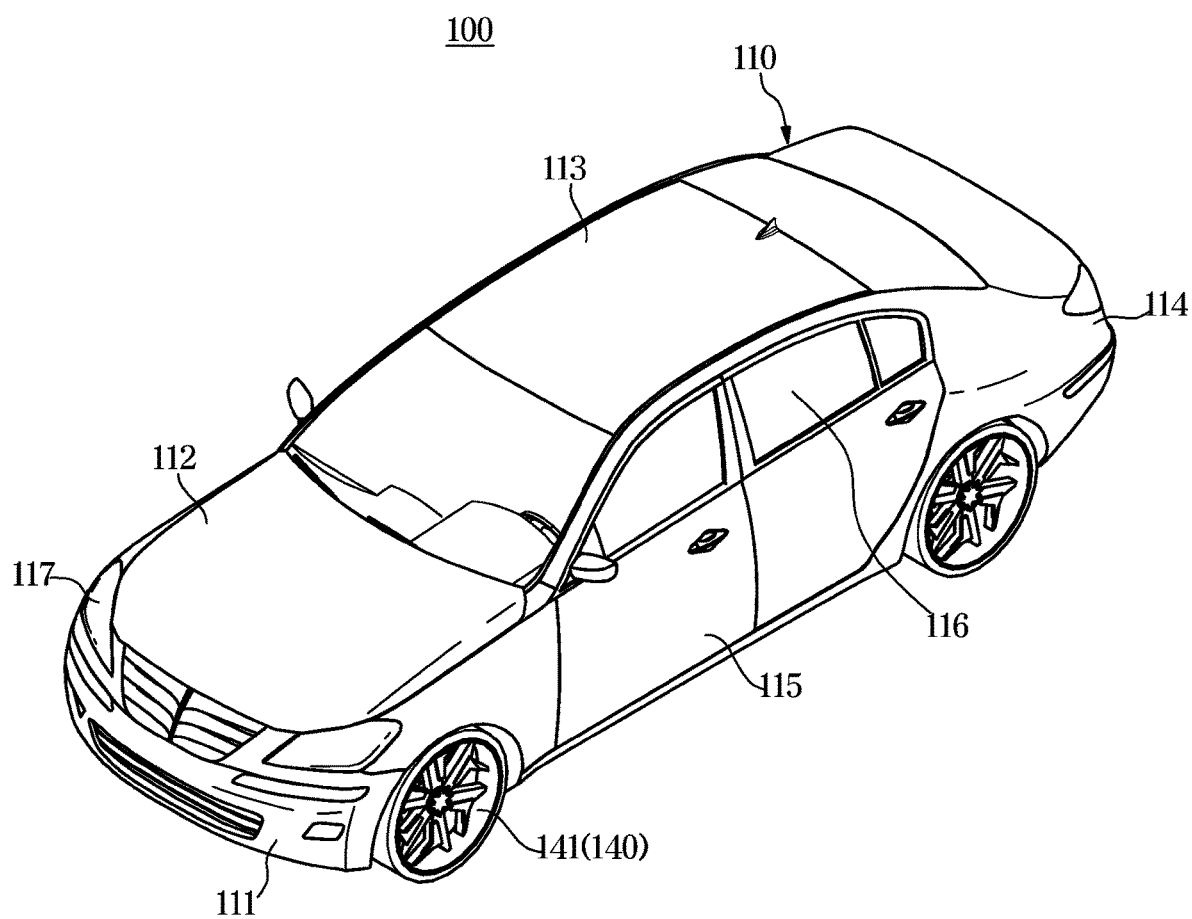
FIG. 1 is a view exemplarily illustrating an external of a vehicle body of a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings.

FIG. 1 is a view exemplarily illustrating an external of a vehicle body of a vehicle according to an exemplary embodiment of the present invention.

A vehicle 100 according to an exemplary embodiment of the present invention may be a plug-in hybrid electric vehicle (PHEV) driven by an engine, a battery, and a motor and controlling the mechanical power of the engine and the electric power of the motor. However, the disclosure is not limited to an eco-friendly vehicle, and if a transmission is provided with a Shift-by-Wire (SBW) type, the type of vehicle does not matter.

The vehicle 100 may include a vehicle body with an external 110 and an internal, and other parts, i.e., chassis, on which mechanical devices required for driving are disposed.

As illustrated in FIG. 1, the external 110 of the vehicle body may include a front panel 111, a bonnet 112, a roof panel 113, a rear panel 114, front, rear, left and right doors 115, and window glasses 116 mounted on the front, rear, left and right doors 115 to be openable or closable.

The external 110 of the vehicle body may include a filler provided at a boundary between the window glasses 116 of the front, rear, left and right doors 115, a side mirror for providing a driver with the rear view of the vehicle 100, and a lamp 117 for easy viewing of surrounding information while observing the front view, and performing functions as a signal and communication for other vehicles and pedestrians.

Although not illustrated, the vehicle 100 may display an electric vehicle mode (i.e., an EV mode), a hybrid electric vehicle mode (i.e., an HEV mode), or the like, which is a current driving mode of the vehicle 100.

Figure 2:
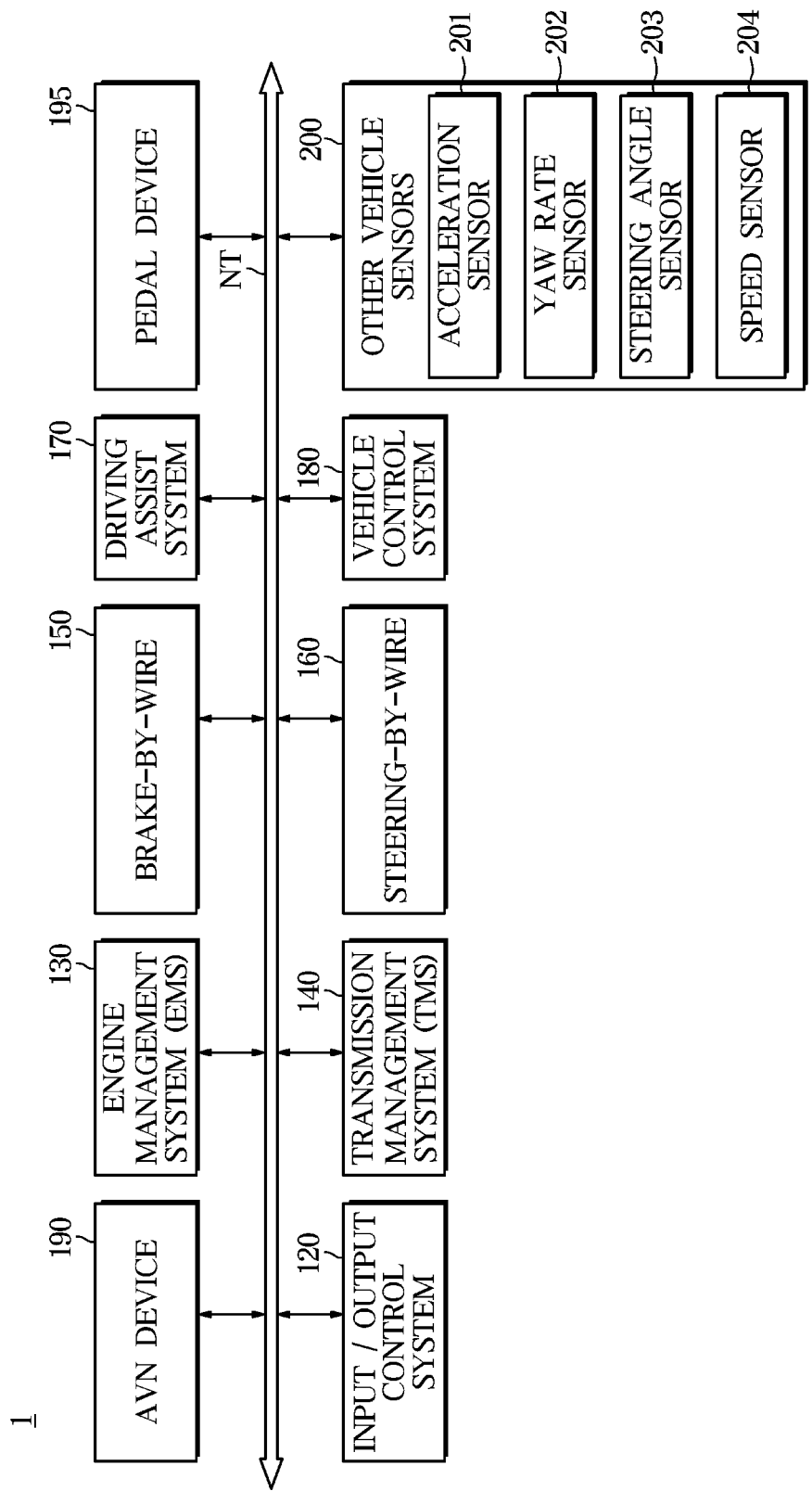
FIG. 2 is a block diagram illustrating various electronic apparatuses included in a vehicle provided with a vehicle control system according to an exemplary embodiment of the present invention.

FIG. 2 is a block diagram illustrating various electronic apparatuses included in a vehicle provided with a vehicle control system according to an exemplary embodiment of the present invention.

The disclosure may be provided to explain a method of controlling the vehicle 100 in the case where the driver can stop and park the vehicle 100 such as when the vehicle 100 is shifted from a D (Drive)-stage (driving mode) to a P (Parking)-stage (parking mode) or the vehicle 100 is shifted from an R-stage to the P-stage.

Thus, the vehicle 100 including a vehicle control system 180 according to an exemplary embodiment of the present invention may include various electronic devices 1, as illustrated in FIG. 1.

as illustrated in FIG. 2, the vehicle 100 may include an Audio/Video/Navigation (AVN) device 190, an input/output control system 120, an Engine Management System (EMS) 130, a Transmission Management System (TMS) 140, a brake-by-wire 150, a steering-by-wire 160, a driving assist system 170, the vehicle control system 180, a pedal device 195, other vehicle sensors 200, or the like.

However, the various electronic devices 1 illustrated in FIG. 2 is only a portion of the electronic device included in the vehicle 100, and the vehicle 100 may be provided with more of the various electronic devices 1.

Furthermore, the various electronic devices 1 included in the vehicle 100 may communicate with each other through a vehicle communication network NT. The vehicle communication network NT may adopt a communication standard, such as Media Oriented Systems Transport (MOST) having a communication speed of a maximum of 24.5 Mbps (Megabits per second), FlexRay having a communication speed of a maximum of 10 Mbps, Controller Area Network (CAN) having a communication speed from 125 kbps (kilo-bits per second) to 1 Mbps, and Local Interconnect Network (LIN) having a communication speed of 20 kbps. The vehicle network NT may adopt one or more communication standards of MOST, FlexRay, CAN, and LIN.

The AVN device 190 may be an apparatus configured for outputting music or an image according to the driver's control command. The AVN device 190 may play music or moving images according to the driver's control command or guide a path to a destination received from a navigation system.

The input/output control system 120 may receive the driver's control command through buttons and displays information corresponding to the driver's control command. The input/output control system 120 may include a cluster display mounted on a dashboard to display the images, a head up display for projecting the images on a wind screen, and a wheel button module disposed on a steering wheel.

Accordingly, the vehicle 100 including the input/output control system 120 may show an operation state of the vehicle control system 180 so that the driver can confirm the operation state.

The EMS 130 may perform fuel injection control, fuel ratio feedback control, lean burn control, ignition timing control, idling control, or the like. The EMS 130 may be a single device, or may be a plurality of devices connected through communication.

The TMS 140 may perform shifting point control, damper clutch control, pressure control when a friction clutch is turned on/off, and engine torque control during shifting. The TMS 140 may be a single device, or may be a plurality of devices connected through communication.

For example, when the friction clutch in the TMS 140 is turned on, a braking force may be controlled to be interrupted. When the friction clutch is turned off, the braking force may be controlled to be transmitted.

The brake-by-wire 150 may control the braking of the vehicle 100 and may typically include an anti-lock brake system (ABS), or the like.

The steering-by-wire 160 may assist a steering operation of the driver by reducing a steering force during low-speed driving or parking and increasing the steering force during high-speed driving.

The driving assist system 170 may assist the driving of the vehicle 100 and may perform a forward collision avoiding function, a lane departure warning function, a blind spot detection function, a rearward monitoring function, or the like.

The driving assist system 170 may include a plurality of devices connected through communication. For example, the driving assist system 170 may include a Forward Collision Warning System (FCW) for detecting a driving vehicle in the same forward direction of a driving lane and avoiding a collision with a forward vehicle, an Advanced Emergency Braking System (AEBS) for mitigating an impact when a collision with the forward vehicle is unavoidable, an Adaptive Cruise Control (ACC) for detecting the vehicle 100 driving in the same direction in front of the driving lane and automatically accelerating/decelerating according to a speed of the forward vehicle, a Lane Departure Warning System (LDWS) for preventing the vehicle 100 from leaving the driving lane, a Lane Keeping Assist System (LKAS) for controlling the vehicle 100 to return to the original lane when it is determined that the vehicle 100 departs from the driving lane, a Blind Spot Detection (BSD) that provides information related to the vehicle located in a blind spot to the driver, a Rear-end Collision Warning System (RCW) for detecting the vehicle 100 driving in the same direction behind the driving lane and avoiding a collision with a rearward vehicle, or the like.

The pedal device 195 may include a brake pedal and an accelerator pedal. The brake pedal is a pedal which is operated by the driver's foot for braking and may be made to decelerate by generating hydraulic pressure by pushing a piston of a master cylinder. At the instant time, it is possible to determine the driver's braking intention by measuring a pressing force for operating the brake pedal with the driver's foot with a pressing force sensor.

The accelerator pedal is a pedal which is operated by the driver's foot for accelerating. The accelerator pedal may be accelerated by accelerating the rotation of the engine interlocked with a carburetor within the vehicle 100 when the accelerator pedal is depressed. At the instant time, it is possible to determine the driver's braking intention by measuring the pressing force for operating the accelerator pedal with the driver's foot with the pressing force sensor.

Next, the vehicle control system 180 will be described in detail in FIG. 3 and FIG. 4, which will be described later.

The other vehicle sensors 200 may be included in the vehicle 100 and may include an acceleration sensor 201, a yaw rate sensor 202, a steering angle sensor 203, a speed sensor 204 or the like to detect driving information related to the vehicle 100.

The acceleration sensor 201 may measure the acceleration of the vehicle 100, and may include a lateral acceleration sensor and a longitudinal acceleration sensor. The yaw rate sensor 202 may be disposed on each wheel of the vehicle 100 to detect a yaw rate value in real time. The steering angle sensor 203 may measure a steering angle and may be mounted on the lower end portion of a steering wheel 60 to detect a steering speed, a steering direction thereof, and the steering angle of the steering wheel. The speed sensor 204 may be disposed inside the wheel of the vehicle 100 to detect the rotation speed of the wheel. However, various sensors for detecting the state of the vehicle 100 included in the other vehicle sensors 200 are not limited to the acceleration sensor 201, the yaw rate sensor 202, the steering angle sensor 203, and the speed sensor 204. Furthermore, various other sensors may be further included.

The configuration of the vehicle 100 has been described above.

The configuration and operation of the vehicle control system 180 included in the vehicle 100 will be described below.

Figure 3:
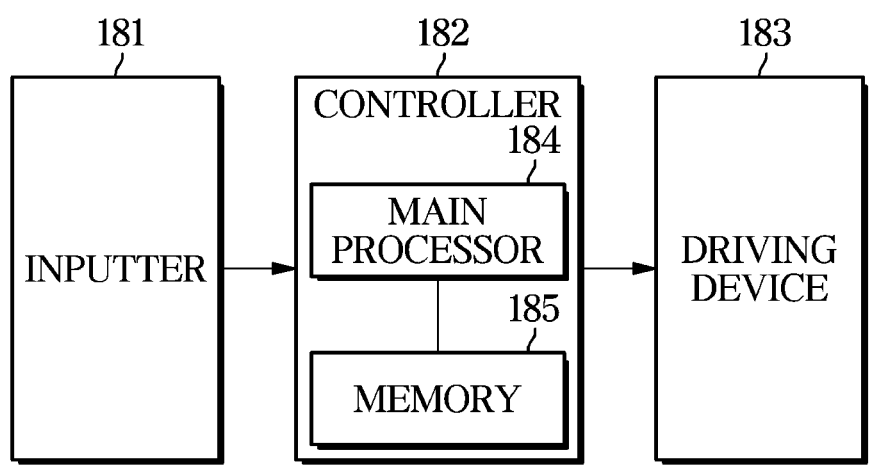
FIG. 3 and FIG. 4 are block diagrams of a vehicle control system according to an exemplary embodiment of the present invention.
Figure 4:
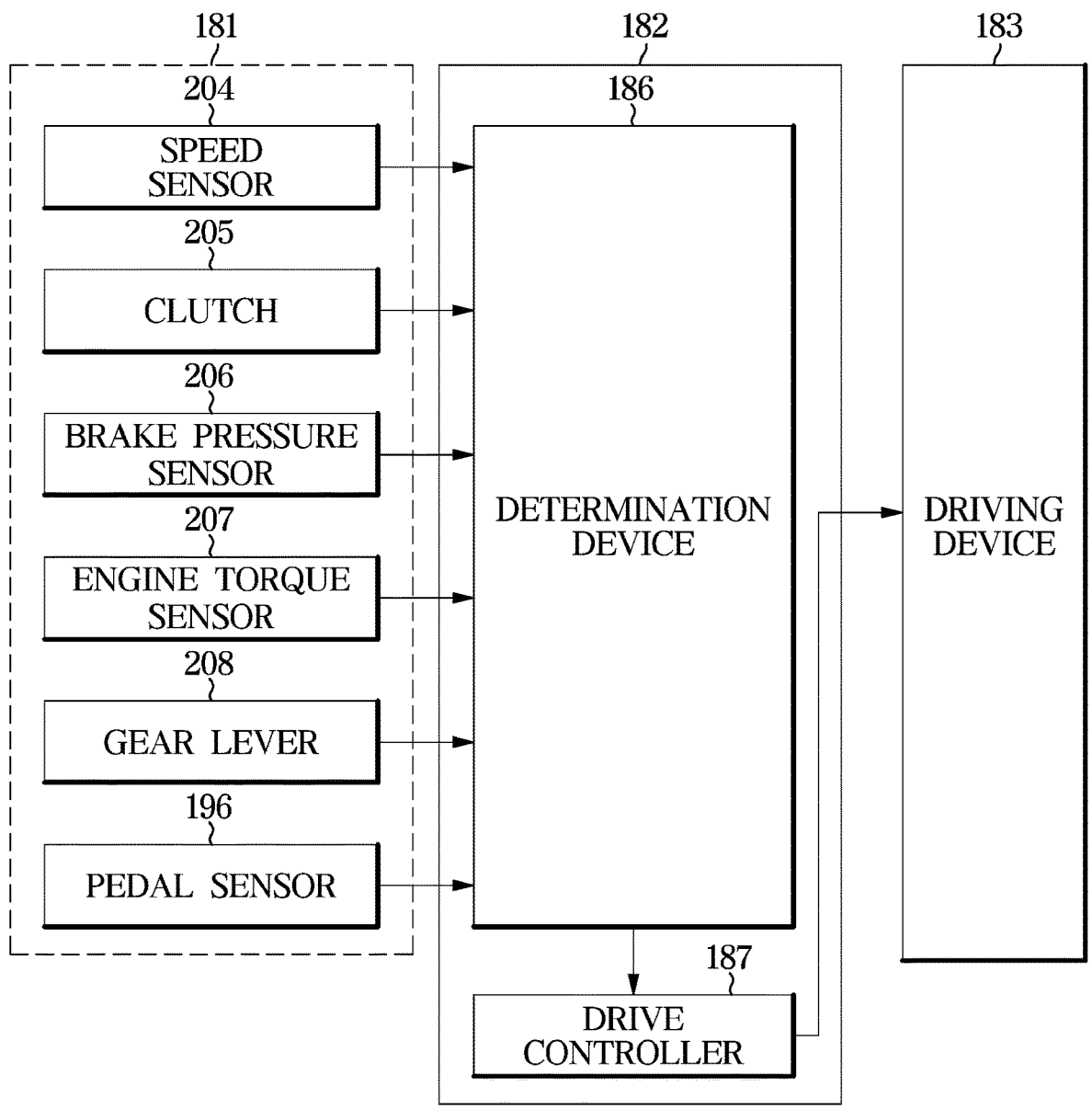

FIG. 3 is a block diagram for describing hardware components of the vehicle control system 180, and FIG. 4 is a block diagram for describing software components of the vehicle control system 180.

As illustrated in FIG. 3, the vehicle control system 180 according to an exemplary embodiment of the present invention may include an inputter 181 for receiving an operation signal from the various electronic devices 1 included in the vehicle 100, a controller 182 for obtaining an input signal of the inputter 181 and determining whether additional control for parking sprag protection is required when there is a gear change to the driver's parking brake at a low speed state, and a driving device 183 for performing braking control according to a control signal of the controller 182.

At the instant time, the controller 182 may include a main processor 184 for determining the control signal in hardware and a memory 185 for storing various control signals and control methods.

The main processor 184 may be a CPU or an MCU and may be implemented as one chip or a plurality of chips.

The memory 185 may store various types of data necessary for the operation of the main processor 184 and may be a volatile memory such as Static Random Access Memory (S-RAM) and Dynamic Random Access Memory (D-RAM), or a non-volatile memory such as a flash memory, Read Only Memory (ROM), Erasable Programmable ROM (EPROM), and Electrically Erasable Programmable ROM (EEPROM).

The non-volatile memory may semi-permanently store control programs and control data for controlling the operation of the vehicle control system 180. The volatile memory may temporarily store control programs and control data from the non-volatile memory, and may temporarily store various sensor information and various control signals output from the main processor.

Hereinafter, software components for controlling the operations of the inputter 181, the controller 182, and the driving device 183 of the vehicle control system 180 will be described with reference to FIG. 4.

First, the inputter 181 may receive an operation signal from various electronic devices included in the vehicle 100. For example, the inputter 181 may receive a vehicle speed from the speed sensor 204. Furthermore, the inputter 181 may receive engage/disengage information related to a clutch 205. The inputter 181 may receive the braking pressure of each wheel from a brake pressure sensor 206. Furthermore, the inputter 181 may receive an engine torque value from an engine torque sensor 207.

Furthermore, the inputter 181 may obtain shift information related to a gear lever 208. Therefore, it is possible to obtain information on whether the driver has changed the gear lever 208 from the D-stage to the P-stage or from the R-stage to the P-stage.

Furthermore, the inputter 181 may receive notification from a pedal sensor 196 included in the pedal device 195 of whether there is the driver's acceleration intention by applying the pressing force on the accelerator pedal, or whether there is the driver's braking intention by applying the pressing force on the brake pedal.

Furthermore, although not illustrated, the inputter 181 may receive detection information obtained by detecting gradient information related to the road on which the vehicle 100 is driving.

However, the present invention is not limited thereto, and the inputter 181 may obtain operation signals of the various electronic devices 1 included in the vehicle 100.

The controller 182 may include a determination device 186 for determining whether a torque limit for preventing damage of the parking sprag is required by determining the state of the vehicle 100 based on the sensor values of various sensors input to the inputter 181 and the operation signals of the various electronic devices 1, and a drive controller 187 for generating a drive control signal according to the determination result of the determination device 186.

Hereinafter, by the determination device 186, a method of determining whether or not torque limitation for preventing damage of the parking sprag is required in a gear change state of the vehicle 100 will be described in detail.

Figure 5:
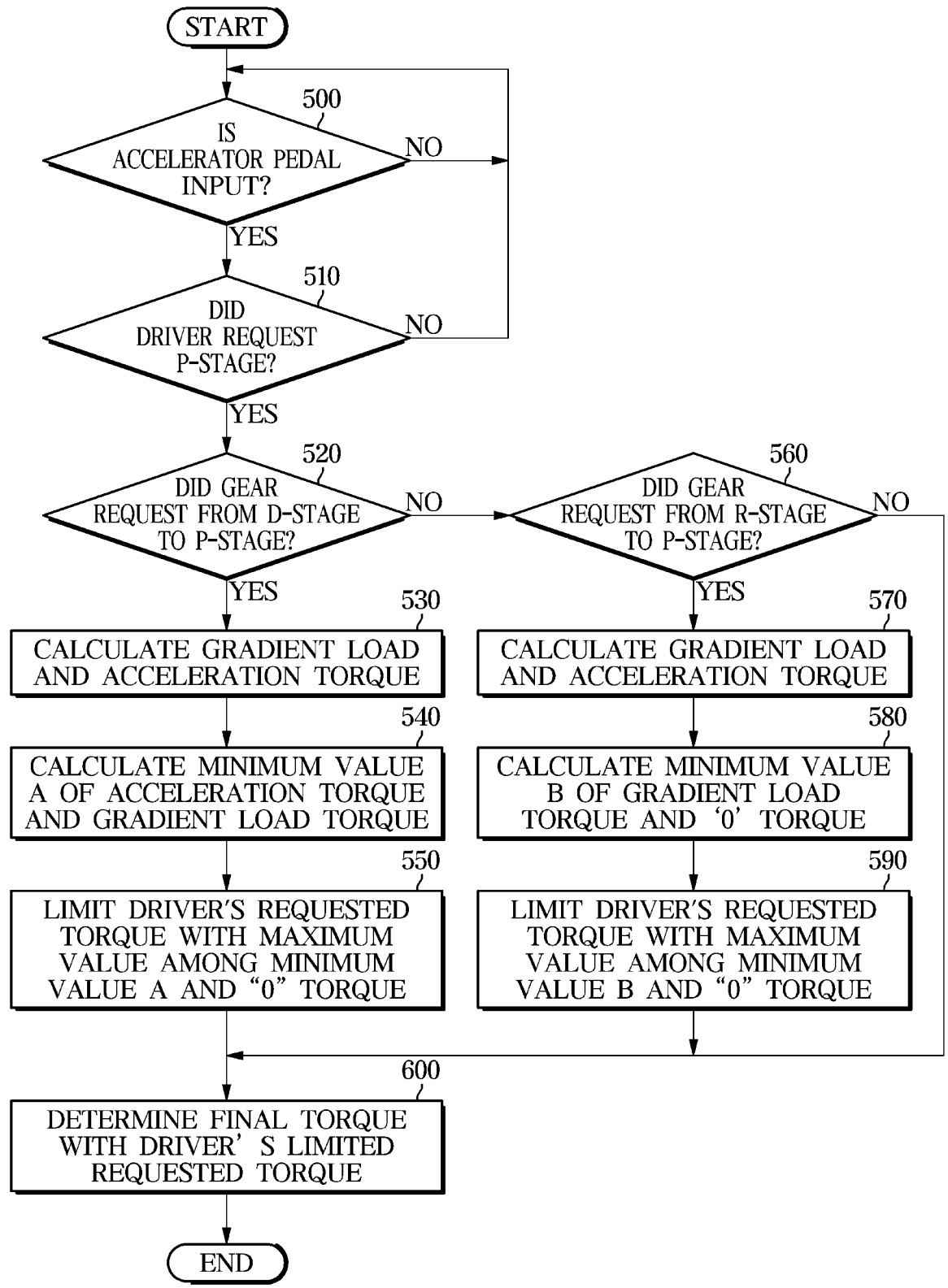
FIG. 5 is a flowchart illustrating a method of controlling a vehicle according to an exemplary embodiment of the present invention.
Figure 6:
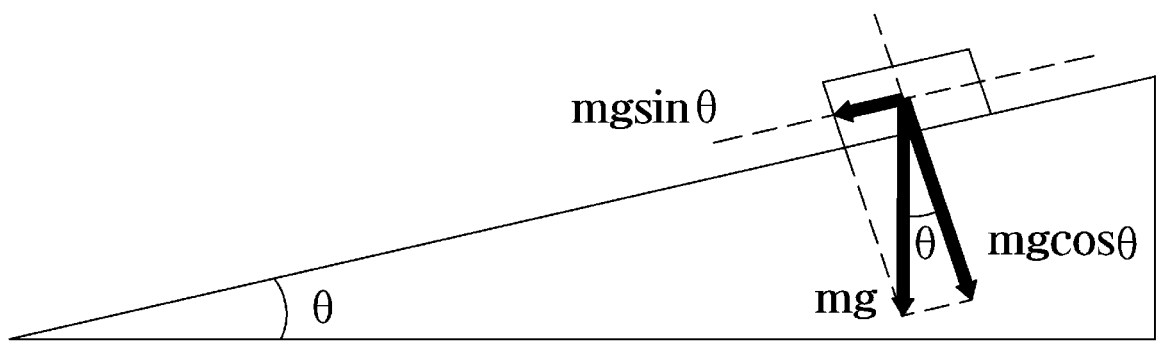
FIG. 6 is a schematic view for describing a method of determining a gradient load torque.
Figure 7:
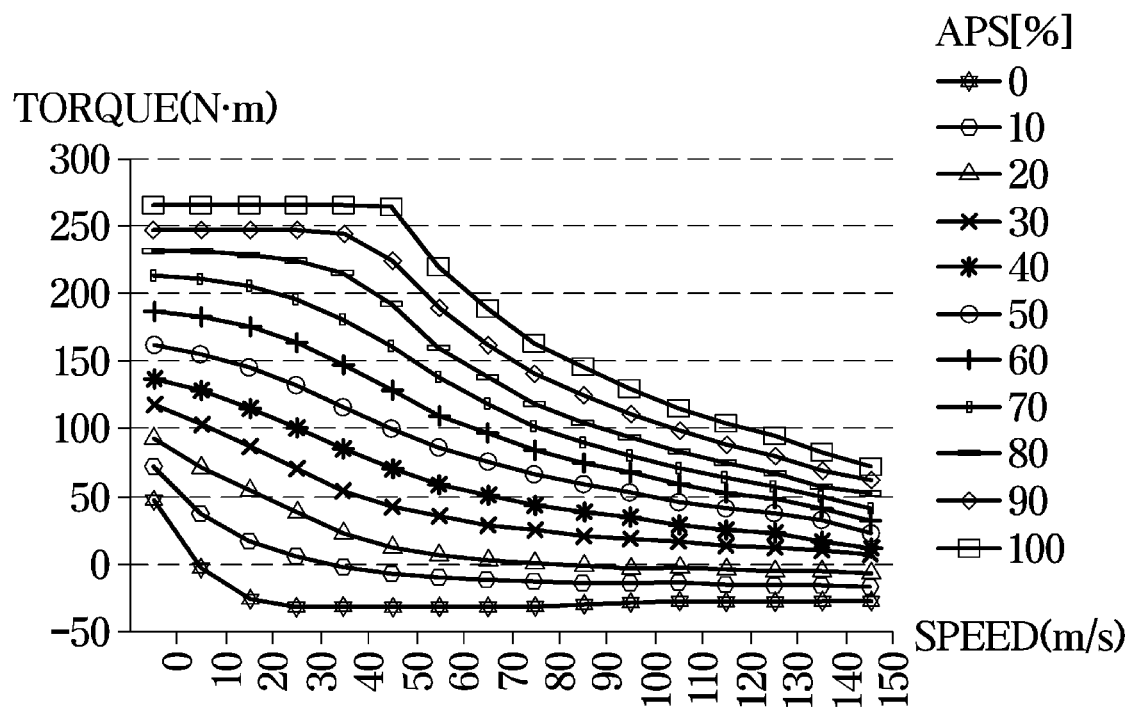
FIG. 7 is a map for determining an acceleration torque.

FIG. 5 is a flowchart illustrating a determination method of the determination device 186 in the vehicle control system 180 according to an exemplary embodiment of the present invention, FIG. 6 is a schematic view for describing a method of determining a gradient load torque, and FIG. 7 is a map for determining an acceleration torque.

In other words, the determination device 186 may determine whether the driver's requested torque limitation for preventing damage of the parking sprag is required in the gear change state of the driver in consideration of both the gradient load torque generated due to the gradient of the driving road of the vehicle 100 and the acceleration torque generated from the vehicle speed.

First, the determination device 186 may determine whether the pressing force is applied to the accelerator pedal from the signal input from the inputter 181 (500). At the instant time, the pressing force is applied to the accelerator pedal (YES in operation 500), and it is determined whether the driver has requested the P-stage from the D-stage or the R-stage (510). That is, the determination device 186 may obtain P-stage request information related to the driver from the shift information related to the gear lever 208.

When the shift information related to the gear lever 208 is requested to change from the D-stage to the P-stage (YES in operation 520), the driver's requested torque may be limited through operations 530 to 550.

Alternatively, when the shift information related to the gear lever 208 is a request to change from the R-stage to the P-stage (YES in operation 560), the driver's requested torque may be limited through operations 570 to 590.

Thus, finally, the vehicle control system 180 may determine a final torque at the driver's limited requested torque value when the driver's limited requested torque is greater than '0' torque (600).

First, a description will be provided of a method of limiting the driver's requested torque of the controller 182 in a case where the shift information related to the gear lever 208 from the D-stage to the P-stage is requested to change.

First, the controller 182 may determine a gradient load and the acceleration torque (530). At the instant time, a method of determining the gradient load torque may be determined as [Equation 1] with reference to the drawing of FIG. 6.

$$\text{gradient load torque} = m * g * \sin(\theta) * r \qquad \text{[Equation 1]}$$

Here, m is a vehicle load, g is a gravitational acceleration, θ is a tilt angle, and r is a radius of a tire. Therefore, the controller 182 may determine the gradient load torque generated on the driving road of the vehicle 100 while driving based on [Equation 1].

The controller 182 may also determine the acceleration torque (530). At the instant time, a method of determining the acceleration torque may be determined with reference to the drawing of FIG. 7. FIG. 7 may be the acceleration torque map according to the vehicle speed, and it may be confirmed that the acceleration torque amount corresponding to the vehicle speed is changed according to a depression percentage of an accelerator pedal sensor (APS) included in the pedal sensor 196.

Accordingly, the controller 182 may determine a minimum value A of the acceleration torque determined based on the gradient load torque determined based on [Equation 1] and the torque map of FIG. 7 (540). Accordingly, the controller 182 may limit the driver's requested torque to a maximum value by comparing the determined minimum value A of the acceleration torque with 0. That is, by limiting the driver's requested torque, the parking sprag may be prevented from being damaged.

Therefore, the controller 182 may set the maximum value by comparing the minimum value A of the determined acceleration torque with 0, but a specific torque value does not necessarily have to be 0, and may be determined as the specific torque value which may be changed as needed.

Next, a description will be provided of a method of limiting the driver's requested torque of the controller 182 in a case where the shift information related to the gear lever 208 from the R-stage to the P-stage is requested to change.

First, the controller 182 may determine the gradient load and the acceleration torque (570). At the instant time, the method of determining the gradient load torque may be determined as [Equation 1] with reference to the drawing of FIG. 6.

The controller 182 may also determine the acceleration torque (570). At the instant time, the method of determining the acceleration torque may be determined with reference to the drawing of FIG. 7.

Therefore, the controller 182 may compare the gradient load torque determined based on [Equation 1] with 0 to determine a minimum value B (580). However, the specific torque value does not necessarily have to be 0, and may be determined as the specific torque value which may be changed as needed. Accordingly, the controller 182 may limit the driver's requested torque to the maximum value among the determined minimum value B and the determined acceleration torque (590). That is, by limiting the driver's requested torque, the parking sprag may be prevented from being damaged.

That is, the controller 182 may limit the driver's requested torque in consideration of the gradient load torque. Hereinafter, a method of limiting the driver's requested torque according to the gradient will be described with reference to FIGS. 8 to 10.

Figure 8:
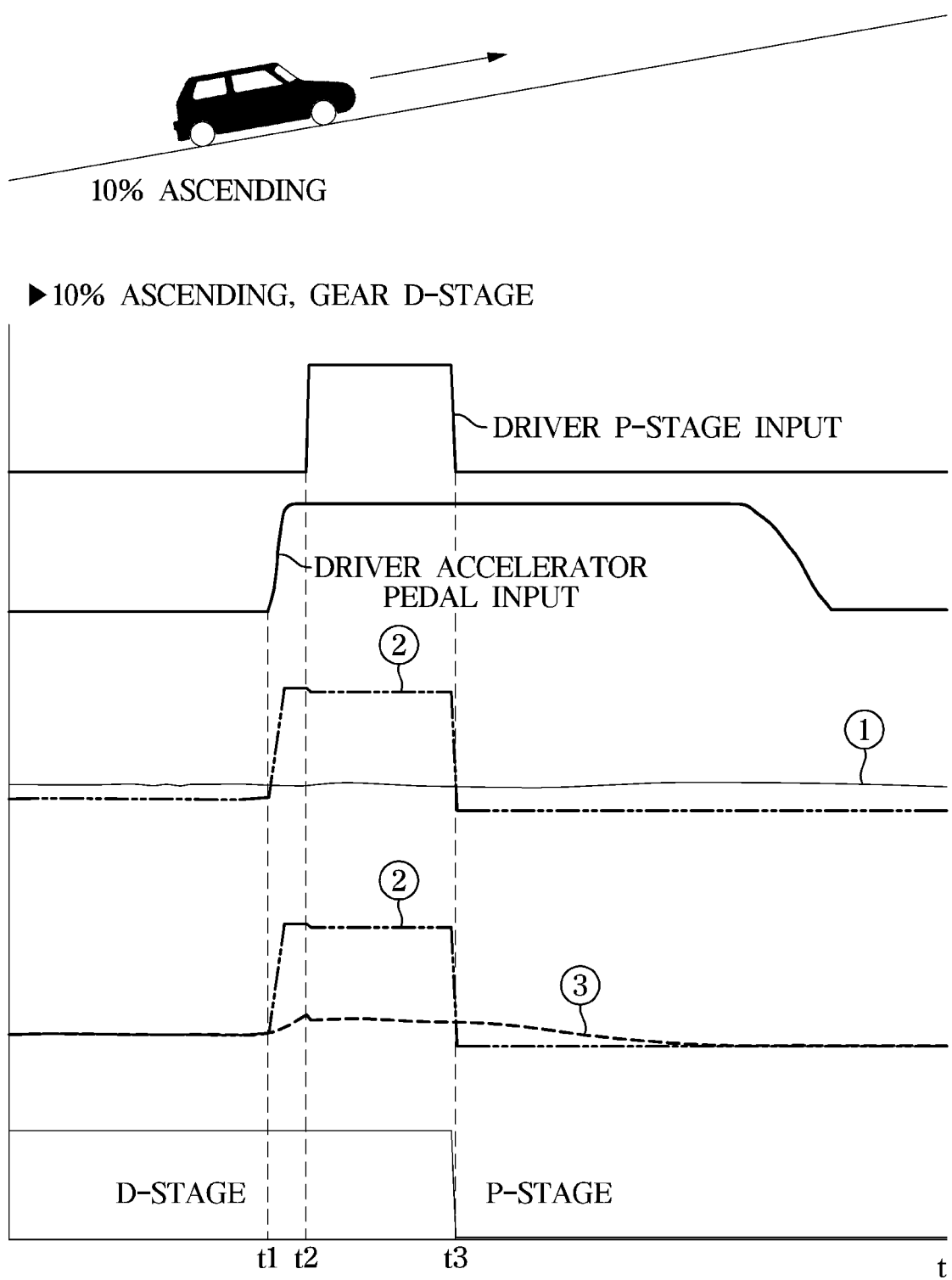
FIG. 8, FIG. 9 and FIG. 10 are graphs illustrating a gear of a vehicle, a driver's accelerator pedal input, a gradient load torque, a driver's requested torque, and a motor torque output according to an exemplary embodiment of the present invention.
Figure 9:
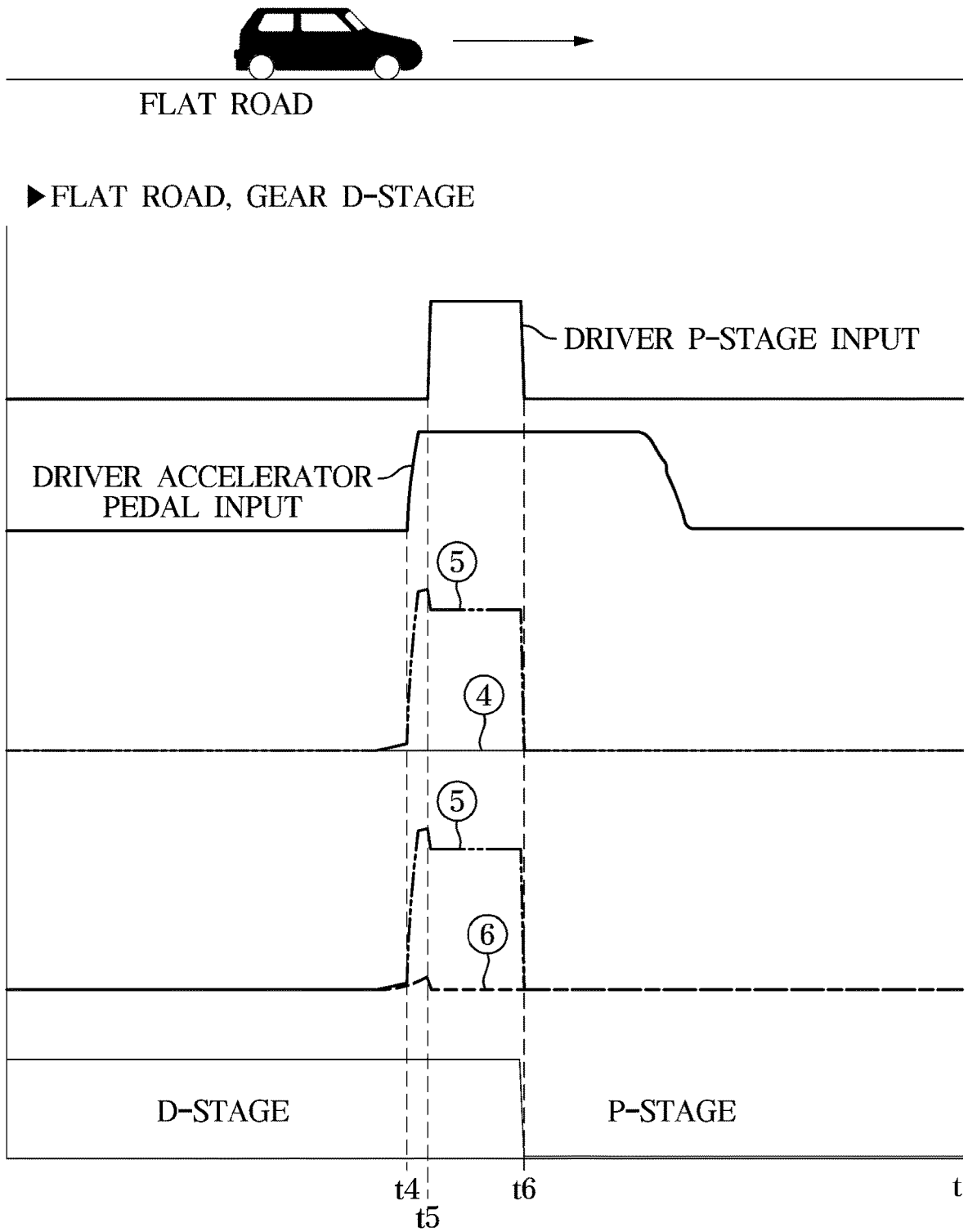
Figure 10:
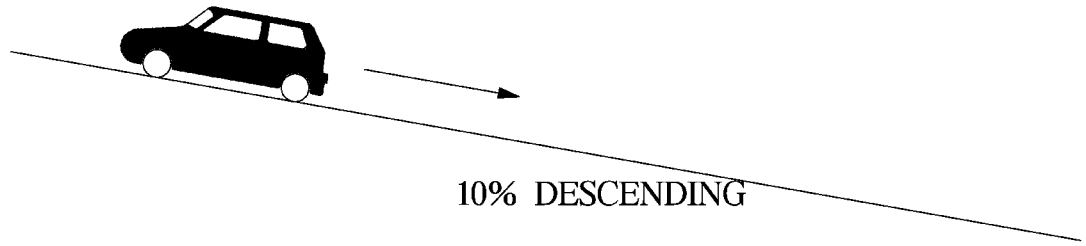
Figure 10:
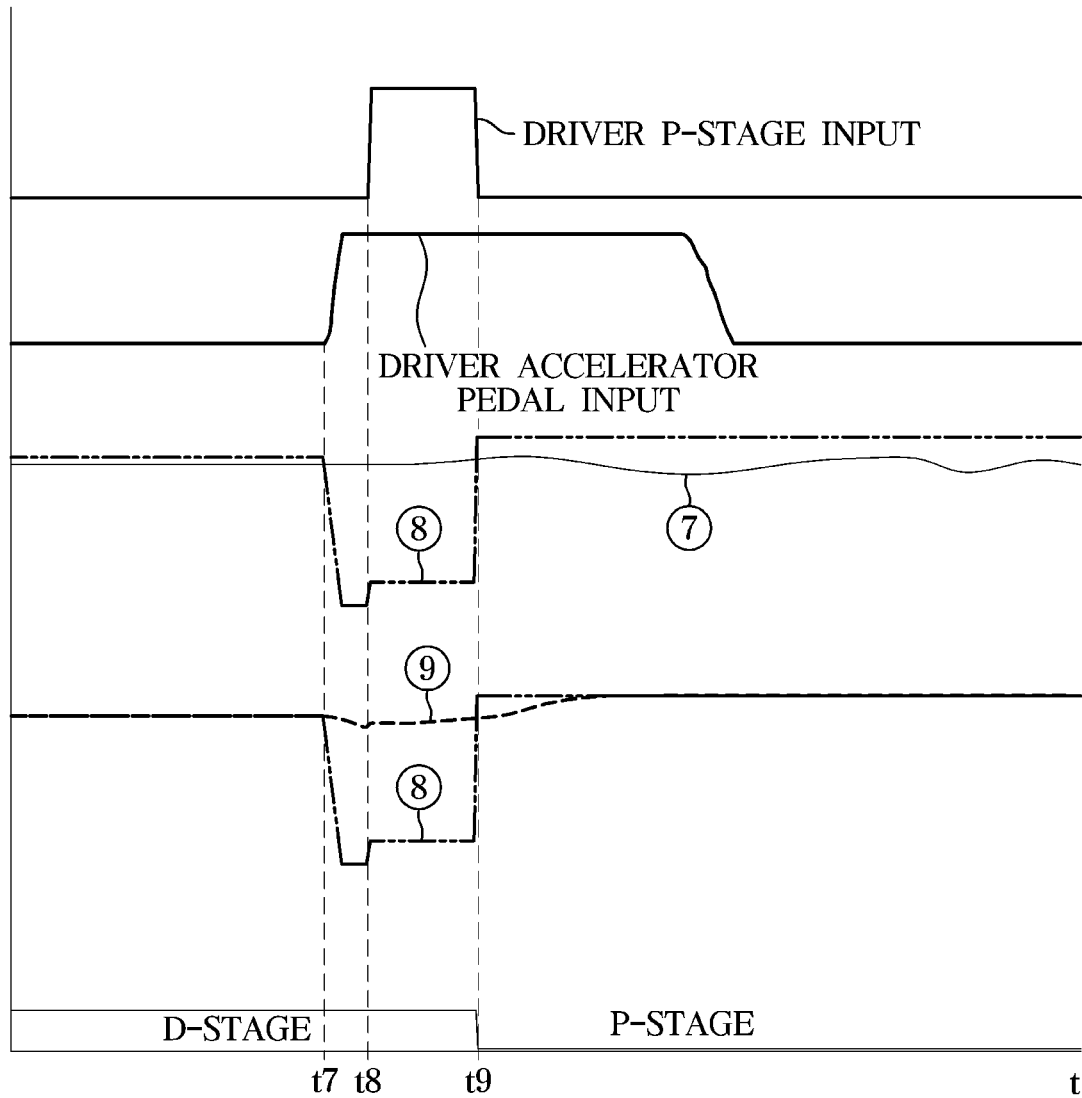

FIG. 8 is a view for describing a method of limiting the driver's requested torque when the vehicle is ascending at the D-stage, FIG. 9 is a view for describing a method of limiting the driver's requested torque when the vehicle is driving on the road which is flat in the D-stage, and FIG. 10 is a diagram for describing a method of limiting the driver's requested torque when the vehicle descends on the road. at the R-stage.

As illustrated in FIG. 8, when the vehicle 100 is ascending at the D-stage, and if the acceleration pedal is input at the same time the P-stage changes to the D-stage, the acceleration torque and the gradient load torque may be determined to secure the minimum value, and the driver's requested torque may be limited to the maximum value among the minimum value and '0' torque.

For example, when the vehicle 100 is driving in the D-stage, and if the acceleration torque is 1000 Nm and the gradient load torque is determined to be 200 Nm, the minimum value A is 200 Nm and the minimum value A is greater than the '0' torque, so 200 Nm may be limited to the driver's final requested torque.

That is, when the vehicle 100 is ascending at the D-stage, the controller 182 may limit the driver's requested torque by the gradient load torque to prevent the movement of the vehicle 100, and then engage a P-stage parking sprag.

However, when the vehicle 100 is at the R-stage, the controller 182 may limit the driver's requested torque by the acceleration torque to prevent the movement of the vehicle 100, and then engage the P-stage parking sprag.

As illustrated in FIG. 8, when the driver inputs the accelerator pedal input at time t1 [sec] and then the driver changes the gear lever 208 from the D-stage to the P-stage at time t2 [sec], ① the graph illustrates the determined gradient load torque, ② the graph illustrates the driver's required torque, and ③ the graph illustrates an output motor torque to limit the driver's requested torque.

That is, ③ the controller 182 limits the output motor torque to the gradient load torque, and when the driver's requested torque is limited to the output motor torque at time t3 [sec] when the vehicle 100 is ascending at the D-stage, the driver's requested torque may be identified to be changed to the P-stage by engaging the parking sprag.

Next, FIG. 9 is a schematic view for describing a method in which the controller 182 limits the driver's requested torque and engages the parking sprag when the vehicle 100 is driving on the flat road in the D-stage.

As illustrated in FIG. 9, when the vehicle 100 is driving on the flat road in the D-stage and the accelerator pedal is input at the same time the P-stage changes to the D-stage, the gradient load torque may be determined to secure the minimum value with the "0" torque, and the driver's requested torque may be limited to the maximum value among the minimum value and the acceleration torque.

For example, when the acceleration pedal is input at the same time as the P-stage shift at the D-stage state and the acceleration torque is 1000 Nm and the gradient load torque is 0 Nm, the minimum value A is 0 Nm and the driver's final requested torque may also be limited to 0 Nm.

Alternatively, when the acceleration pedal is input at the same time as the P-stage shift at the R-stage state, the minimum value B with the '0' torque may be determined when the gradient load torque is 0 Nm, and the driver's final requested torque may be limited to the maximum value of 0 Nm when the determined '0' torque and the acceleration torque are −1000 Nm.

As illustrated in FIG. 9, when the driver inputs the accelerator pedal input at time t4 [sec] and then the driver changes the gear lever 208 from the D-stage to the P-stage at time t5 [sec], ④ the graph illustrates the determined gradient load torque, ⑤ the graph illustrates the driver's required torque, and ⑥ the graph illustrates an output motor torque to limit the driver's requested torque.

That is, ④ the controller 182 limits the output motor torque to the gradient load torque, and when the driver's requested torque is limited to the output motor torque at the time t3 [sec] when the vehicle 100 is driving on the flat road in the D-stage, the driver's requested torque may be identified to be changed to the P-stage by engaging the parking sprag.

Finally, FIG. 10 is a schematic diagram for describing a method in which the controller 182 limits the acceleration torque and engages the parking sprag when the vehicle 100 is descending at the R-stage.

As illustrated in FIG. 10, when the vehicle 100 is descending at the R-stage, and if the acceleration pedal is input at the same time the P-stage changes to the D-stage, the minimum value among the gradient load torque and the '0' torque may be secured, and the driver's requested torque may be limited to the maximum value among the minimum value and the acceleration torque.

That is, when the accelerator pedal and the P-stage are input simultaneously in a gear R-stage, the driver's torque may be limited by the gradient load torque to prevent the movement of the vehicle 100.

For example, when the vehicle 100 is descending at the R-stage, and if the gradient load torque is determined to be −200 Nm, the minimum value B with the '0' torque is −200 Nm, and since the minimum value B is greater than the determined acceleration torque −1000 Nm, −200 Nm may be limited to the driver's final requested torque.

As illustrated in FIG. 10, when the driver inputs the accelerator pedal input at time t7 [sec] and the driver changes the gear lever 208 from the R-stage to the P-stage at time t8 [sec], ⑦ the graph illustrates the determined gradient load torque, ⑧ the graph illustrates the driver's required torque, and ⑨ the graph illustrates an output motor torque to limit the driver's requested torque.

That is, ⑨ the controller 182 limits the output motor torque to the gradient load torque, and when the driver's requested torque is limited to the output motor torque at time t9 [sec] when the vehicle 100 is descending at the R-stage, the driver's requested torque may be identified to be changed to the P-stage by engaging the parking sprag.

As is apparent from the above description, the exemplary embodiments of the present invention may prevent damage of the parking sprag of the vehicle using the SBW type shift lever.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle in which a shift lever of a Shift-by-Wire (SBW) type is used, the vehicle comprising:
    an inputter configured to receive a signal of a pressing force of an acceleration pedal of the vehicle, a shift command to a P-stage of the shift lever, and gradient information related to a road on which the vehicle is driven;
    a controller configured to:
        determine a gradient load torque and an acceleration torque of the vehicle, when the pressing force of the acceleration pedal of the vehicle is generated and the shift command to the P-stage is input to the controller, and
        limit a driver's requested torque based on the determined gradient load torque and the determined acceleration torque; and
    a driving device connected to the controller and configured to shift the shift lever to the P-stage when the driver's requested torque is limited.

2. The vehicle according to claim 1,
    wherein the controller is configured to limit the driver's requested torque with a minimum value of the determined acceleration torque and the determined gradient load torque and a maximum value of a predetermined torque when the vehicle receives the shift command of shifting a D-stage to the P-stage.

3. The vehicle according to claim 1,
    wherein the controller is configured to limit the driver's requested torque with a minimum value of the determined gradient load torque and a predetermined torque and a maximum value of the determined acceleration torque when the vehicle receives the shift command of shifting an R-stage to the P-stage.

4. The vehicle according to claim 2,
    wherein the controller is configured to limit the driver's requested torque with the determined gradient load torque when the vehicle receives the shift command of shifting the D-stage to the P-stage and the vehicle ascends on the road.

5. The vehicle according to claim 2, wherein the controller is configured to:
    determine a final motor torque with a maximum value of the determined gradient load torque and the predetermined torque, when the vehicle receives the shift command of shifting the D-stage to the P-stage and the vehicle is driving on the road which is flat; and
    limit the driver's requested torque with the final motor torque.

6. The vehicle according to claim 3,
    wherein the controller is configured to limit the driver's requested torque with the determined gradient load torque when the vehicle receives the shift command of shifting the R-stage to the P-stage and the vehicle descends on the road.

7. The vehicle according to claim 2, wherein the controller is configured to:
    determine a final motor torque with a minimum value of the determined gradient load torque and the predetermined torque and a maximum value of the determined acceleration torque, when the vehicle receives the shift command of shifting an R-stage to the P-stage and the vehicle is driving on the road which is flat; and
    limit the driver's requested torque with the final motor torque.

8. The vehicle according to claim 1,
    wherein the inputter is configured to receive a speed of the vehicle, and
    wherein the controller is configured to determine the acceleration torque based on a predetermined map based on the speed of the vehicle and the generated pressing force of the acceleration pedal.

9. The vehicle according to claim 8,
    wherein the controller is configured to determine the gradient load torque based on a load of the vehicle, a gravitational acceleration, and the gradient information.

10. The vehicle according to claim 1,
    wherein the driving device is configured to selectively shift the shift lever to the P-stage and engage a parking sprag of a transmission.

11. A method of controlling a vehicle, the vehicle in which a shift lever of a Shift-by-Wire (SBW) type is used, the method comprising:
    receiving, by an inputter, a pressing force of an acceleration pedal of the vehicle, a shift command to a P-stage of the shift lever, and gradient information related to a road on which the vehicle drives;
    determining, by a controller, a gradient load torque and an acceleration torque of the vehicle, when the pressing force of the acceleration pedal of the vehicle is generated and the shift command to the P-stage is input to the controller,
    limiting, by the controller, a driver's requested torque based on the determined gradient load torque and the determined acceleration torque; and
    shifting, by a driving device, the shift lever to the P-stage when the driver's requested torque is limited.

12. The method according to claim 11, wherein the limiting of the driver's requested torque based on the determined gradient load torque and the determined acceleration torque includes:
    limiting the driver's requested torque with a minimum value of the determined acceleration torque and the determined gradient load torque and a maximum value of a predetermined torque when the vehicle receives the shift command of shifting a D-stage to the P-stage.

13. The method according to claim 11, wherein the limiting of the driver's requested torque based on the determined gradient load torque and the determined acceleration torque includes:
    limiting the driver's requested torque with a minimum value of the determined gradient load torque and a predetermined torque and a maximum value of the determined acceleration torque when the vehicle receives the shift command of shifting an R-stage to the P-stage.

14. The method according to claim 12, wherein the limiting of the driver's requested torque based on the determined gradient load torque and the determined acceleration torque includes:
    limiting the driver's requested torque with the determined gradient load torque when the vehicle receives the shift command of shifting the D-stage to the P-stage and the vehicle ascends on the road.

15. The method according to claim 12, wherein the limiting of the driver's requested torque based on the determined gradient load torque and the determined acceleration torque includes:
    determining a final motor torque with a maximum value of the determined gradient load torque and the predetermined torque, when the vehicle receives the shift command of shifting the D-stage to the P-stage and the vehicle is driving on the road which is flat; and limiting the driver's requested torque with the final motor torque.

16. The method according to claim 13, wherein the limiting of the driver's requested torque based on the determined gradient load torque and the determined acceleration torque includes:

limiting the driver's requested torque with the determined gradient load torque when the vehicle receives the shift command of shifting the R-stage to the P-stage and the vehicle descends on the road.

17. The method according to claim 12, wherein the limiting of the driver's requested torque based on the determined gradient load torque and the determined acceleration torque includes:

determining a final motor torque with a minimum value of the determined gradient load torque and the predetermined torque and a maximum value of the determined acceleration torque, when the vehicle receives the shift command of shifting an R-stage to the P-stage and the vehicle is driving on the road which is flat; and limiting the driver's requested torque with the final motor torque.

18. The method according to claim 11, wherein the inputter is configured to receive a speed of the vehicle, and wherein the determining of the acceleration torque includes:

determining the acceleration torque based on a predetermined map based on the speed of the vehicle and the generated pressing force of the acceleration pedal.

19. The method according to claim 18, wherein the determining of the gradient load torque includes:

determining the gradient load torque based on a load of the vehicle, a gravitational acceleration, and the gradient information.

20. The method according to claim 11, further including:

shifting selectively the shift lever to the P-stage and engaging a parking sprag of a transmission.

* * * * *